United States Patent
Barksdale

(10) Patent No.: US 7,330,068 B2
(45) Date of Patent: Feb. 12, 2008

(54) ADJUSTING COEFFICIENTS OF A FILTER

(75) Inventor: Tobe Barksdale, Bolton, MA (US)

(73) Assignee: Bose Corporation, Framingham, MA (US)

( * ) Notice: Subject to any disclaimer, the term of this patent is extended or adjusted under 35 U.S.C. 154(b) by 83 days.

(21) Appl. No.: 10/124,549

(22) Filed: Apr. 16, 2002

(65) Prior Publication Data

US 2003/0193366 A1 Oct. 16, 2003

(51) Int. Cl.
*H03H 7/30* (2006.01)

(52) U.S. Cl. ............... 329/315; 329/318; 375/230

(58) Field of Classification Search ........... 375/230, 375/231, 232, 334; 329/315, 318, 319, 320
See application file for complete search history.

(56) References Cited

U.S. PATENT DOCUMENTS

| | | | | | |
|---|---|---|---|---|---|
| 4,309,770 | A | * | 1/1982 | Godard | 375/232 |
| 5,267,266 | A | * | 11/1993 | Chen | 375/232 |
| 5,506,871 | A | * | 4/1996 | Hwang et al. | 375/230 |
| 5,553,014 | A | * | 9/1996 | De Leon et al. | 708/322 |
| 5,697,084 | A | * | 12/1997 | Tingley | 455/276.1 |
| 5,740,206 | A | * | 4/1998 | Lomp et al. | 375/346 |
| 5,809,074 | A | * | 9/1998 | Werner et al. | 375/233 |
| 5,907,303 | A | * | 5/1999 | Yukitomo et al. | 342/380 |
| 5,909,466 | A | * | 6/1999 | Labat et al. | 375/233 |
| 5,940,440 | A | * | 8/1999 | Werner et al. | 375/231 |
| 6,292,135 | B1 | * | 9/2001 | Takatori et al. | 342/383 |
| 6,782,036 | B1 | | 8/2004 | Dowling et al. | |
| 2003/0219085 | A1 | * | 11/2003 | Endres et al. | 375/350 |

OTHER PUBLICATIONS

J.R. Treichler and B.G. Agee, " A New Approach to Multipath Correction of Constant Modulus signals." IEEE Trans. On ASSP, Bol 31, No. 2 pps. 459–472, Apr. 1983.*

Richard P. Gooch and Brian Daellenbach, "Prevention of Interference Capture in a Blind (CMA–Based) Adaptive Receive Filter." Conference Record of the 23rd Asilomar Conference on Singals, Systems and Computers, Maple Press, pps.898–902, Nov. 1989.*

Y.S. Choi, H. Hwang, and D.I. Song, "Adaptive Blind Equalization Coupled with Carrier Recovery for HDTV Modern, "IEEE Transactions on Consumer Electronics, vol. 39, No. 3, pps. 386–391, Aug. 1993.*

* cited by examiner

*Primary Examiner*—Robert Pascal
*Assistant Examiner*—Joseph Chang
(74) *Attorney, Agent, or Firm*—Fish & Richardson P.C.

(57) ABSTRACT

Demodulation apparatus includes a transversal filter characterized by coefficients adjusted by a coefficient determiner responsive to a constant modulus error signal and variable mode error signal related to the output of a spectral mean frequency detector having its input coupled to the output of the transversal filter.

7 Claims, 6 Drawing Sheets

ADJUSTING COEFFICIENTS OF A FILTER

The present invention relates in general to recovering data from modulated signals. More particularly, the present invention concerns reducing the effects of multipath and adjacent channel interference, and other linear time invariant (or slowly time varying) operations that may be applied intentionally or unintentionally to a modulated signal. The invention finds particular use as an adaptive transmission channel equalizer, where it operates to reduce anomalies in a received signal that result from nonidealities in a transmission channel. The invention comprises an adaptive filter structure configured to act as an adaptive equalizer that uses a novel method of adaptation, wherein the error cost function used to adjust the coefficients of the adaptive filter is itself adjusted, based on characteristics of the received signal.

The invention has utility in any system where it is desired to recover data from a modulated signal, where the modulated signal has the following characteristics; 1) A frequency spectrum magnitude that is approximately flat over the modulated signal bandwidth, and 2) A signal magnitude that is substantially constant over time (constant or near constant modulus). The invention has particular utility when used in a radio receiver designed to receive and demodulate frequency modulated (FM) signals, although use in systems with alternate modulation schemes is also advantageous (use as an adaptive channel equalizer in digital communication systems is one additional example).

BACKGROUND OF THE INVENTION

Multipath interference in the time domain may be represented by the superposition of an initial version of a signal of interest (SOI) with multiple delayed and filtered versions of the same signal. The delayed and filtered versions of the SOI result from reflections and other irregularities. When viewed in the frequency domain, multipath interference can be modeled as a comb filter placed somewhere in the transmission path of an SOI.

FIG. 1 is a block diagram of a prior art signal processing system that attempts to reduce the effects of multipath interference on a received signal. This system places an adaptive transversal (or FIR) filter in the receiver signal path whose function is to undo linear errors caused by multipath interference.

Equations 1 through 4 below provide the mathematical foundation for a prior art adaptive transmission channel equalizer based on a Constant Modulus Algorithm (CMA). CMA refers to the type of error estimate used to adjust the transversal filter coefficients. These equations specifically refer to a form of CMA referred to as CMA 2-2 (after Dominique Goddard), but the discussion can be generalized to other forms of CMA known in the prior art.

$$y(k) = W^T(k)X(k) \quad \text{Eq. 1}$$

$$W(k+1) = W(k) - \mu e_{cm}(k) X^*(k) \quad \text{Eq. 2}$$

$$e_{cm}(k) = [|y(k)|^2 - R_2] y(k) \quad \text{Eq. 3}$$

$$R_2 = E\{|y(k)|^4\} / E\{|y(k)|^2\} \quad \text{Eq. 4}$$

In equations 1 through 4 above, $X(k)$ is a vector of input history at time k, $y(k)$ is the scalar output value from the adaptive filter, $W(k)$ is a vector of filter coefficients, $e_{cm}[k]$ is the Constant Modulus Error Estimate, which is based on the CMA 2-2 algorithm, $R_2$ is a constant that is dependent upon the data modulation method used, and represents the scaling necessary to match the adaptive filter output to the thresholds of the data demodulator. For Constant Modulus modulation methods such as frequency modulation (FM), this expression reduces to $R_2 = R_o^2$, where $R_o = E\{|y(k)|\}$. $\mu$ is a step size parameter that adjusts the extent to which coefficients are changed at each time step. Each next set of coefficients $W(k+1)$ is determined based on the previous coefficient values $W(k)$ and an estimate of the gradient of the error of the filter output modulus with respect to the transversal filter tap weights (coefficients).

In prior art system 100 of FIG. 1, an input signal is received by front end block 10. The front end serves as an interface between the outside world and the system of interest. A typical front end may incorporate a signal conditioning function and some type of tuning function. Signal conditioning is usually applied to match the incoming signal from the outside world to the system of interest, in order to enhance system dynamic range and signal to noise ratio (an example is use of an AGC function in the RF front end of a radio receiver). Tuning usually consists of combining a frequency selective function with a frequency shifting function, where the shifting function is used to shift the range of frequencies over which the frequency selectivity occurs.

The output of front end 10 feeds into power normalization block 20. In some systems, power normalization may be performed directly by front end 10 (in the AGC if present). In such systems, a separate power normalization stage is not required. However, it is often the case the output of front end 10 may still have an average signal power that varies considerably with time. In these cases, a separate power normalization function is applied.

FIG. 1 shows power normalization 20 located ahead of the ADC 30. Power normalization 20 may be accomplished by an analog AGC. In system 100 of FIG. 1, the power normalized signal (the output of power normalization block 20) is then digitized by ADC 30 and applied to the input of adaptive transversal filter 40. Eq. 1 defines the signal processing of transversal filter 40 given the input data and coefficient vectors. The output of adaptive transversal filter 40 splits into two paths, a signal path and a control path. The signal path output is demodulated by demodulation block 70 in a manner that represents the inverse of the method used to originally modulate the data. After demodulation, the demodulated signal may also be decoded, if the original modulating signal was encoded in some manner. The output of demodulator 70 is the recovered data signal of interest.

The control path output feeds back into Constant Modulus (CM) Error Estimation block 60. CM error estimation block 60 determines an error cost function in accordance with Eq. 3, which effectively is the difference between the modulus of the output of adaptive filter 40 and a constant value $R_2$ (as defined in Eq. 4). The result of this determination is the error estimate signal $e_{cm}(k)$. The error estimate signal $e_{cm}(k)$ (the output of CM error estimation block 60) feeds into coefficient determination block 50. Coefficient determination block 50 determines coefficient signal updates in accordance with Eq. 2. The coefficient signal values are updated based on the error estimate signal $e_{cm}(k)$, the current coefficient signal values $W(k)$, the adaptation step size $\mu$, and the conjugated input data signal $X^*(k)$. When functioning as intended, the coefficient value signals determined at succeeding time steps change in a direction that tends to minimize the error cost function.

Prior art system 100 of FIG. 1 assumes that the transmitted SOI has a constant modulus property. When such a signal is subject to multipath interference (during transmission, for example), the received signal will no longer have a constant modulus property. (The comb filter behavior caused by multiple reflections destroys the constant modulus behavior). CM error estimation block 60 of prior art system 100 in conjunction with coefficient determination block 50 determines coefficient signals for transversal filter 40 that attempt to force the output of transversal filter 40 to have a constant modulus property. Algorithms that accomplish this behavior are referred to as CMA (constant modulus algorithms).

For additional background reference is made to the following:

| Number | Title | Inventor | Date |
| --- | --- | --- | --- |
| US 5907303 | CMA-Based Antenna System | Yukitomo, et al. | May 25, 1999 |
| US 5809074 | Technique for Improving the Blind Convergennce of an Adaptive Equalizer Using a Transition Algorithm | Werner, et al. | Sep. 15, 1998 |
| US 5940440 | Generalized Multimodulus Technique for Blind Equalization | Werner, et al. | Aug. 17, 1999 |
| US 5697084 | Reducing Multipath Fading Using Adaptive Filtering | Tingley | Dec. 9, 1997 |
| US 4309770 | Method and Device for Training an Adaptive Equalizer by Means of an Unknown Data Signal in a Transmission System Using Double Sideband-Quadrature Carrier Modulation | Godard | Jan. 5, 1982 |
| US 5506871 | Adaptive Equalizing System for Digital Communications | Hwang et al. | Apr. 9, 1996 |
| EP 0 854 589A2 | Adaptive Antenna Diversity Receiver | Akaiwa, et al | Jul. 22, 1998 |

OTHER PUBLICATIONS

J. R. Treichler and B. G. Agee, "A New Approach to Multipath Correction of Constant Modulus Signals," IEEE Trans. On ASSP, Vol 31, No.2, pps. 459–472, April 1983.

Richard P. Gooch and Brian Daellenbach, "Prevention of Interference Capture in a Blind (CMA-Based) Adaptive Receive Filter," Conference Record of the 23rd Asilomar Conference on Signals, Systems and Computers, Maple Press, pps. 898–902, November 1989.

Y. S. Choi, H. Hwang, and D. I. Song, "Adaptive Blind Equalization Coupled with Carrier Recovery for HDTV Modem," IEEE Transactions on Consumer Electronics, Vol. 39, No. 3, pps. 386–391, August 1993.

Widrow, B. and Stearns, S. (1985). Adaptive Signal Processing. Prentice-Hall.

It is an important object of the invention to provide improved methods and means for adaptive transversal filtering.

SUMMARY OF THE INVENTION

The present invention analyzes the received signal to determine if an overlapping, adjacent interfering signal is present. If an interfering signal is detected, the initialization of the adaptive filter is altered in a manner that significantly improves the ability of the filter to converge to the solution that selects the desired signal and rejects the interfering signal. The process that alters the initialization is called altering the mode of the adaptive filter. The present invention comprises a mode controlled blind adaptive transversal filter. The invention substantially improves the ability of an adaptive transversal filter to converge to a desired solution when operating under nonideal conditions (i.e. conditions that give rise to a solution space with more than one minimum).

Other features, objects and advantages will become apparent from the following detailed description when read in connection with the accompanying drawing in which:

DETAILED DESCRIPTION OF THE INVENTION

Figure 2A:
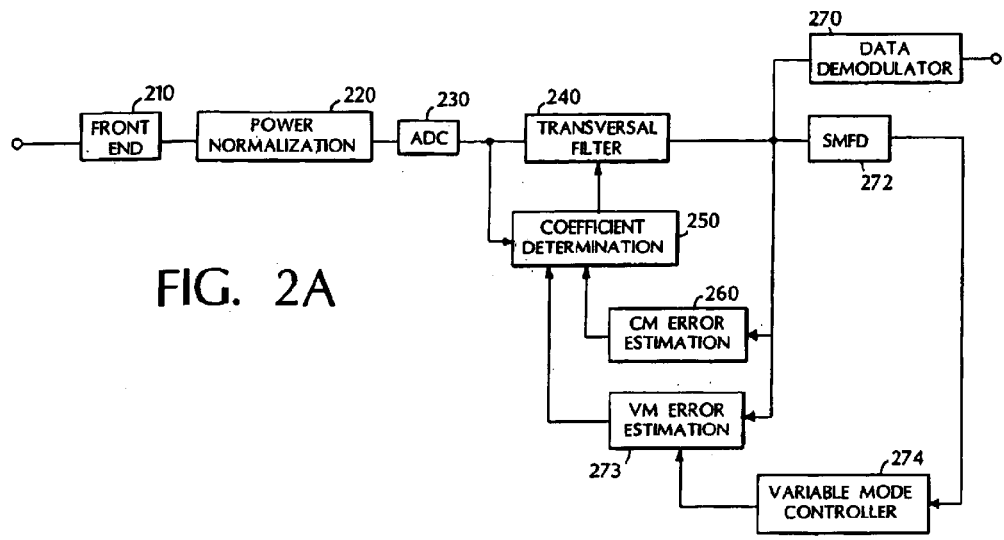
FIG. 2a is a block diagram of the mode controlled blind adaptive filter of the present invention, with power normalization occurring before analog-to-digital conversion.
Figure 2B:
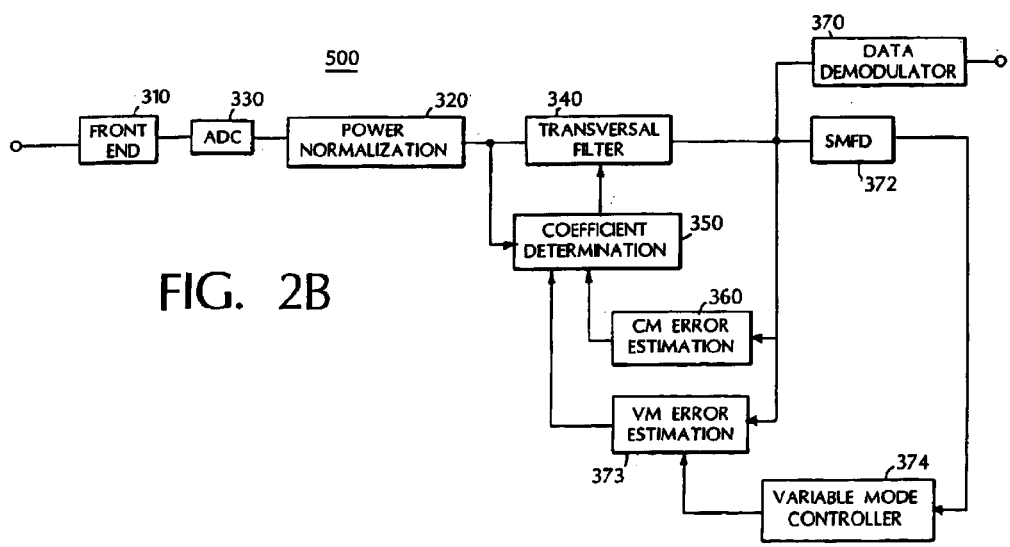
FIG. 2b is a block diagram of an alternative form of the mode controlled blind adaptive filter of the current invention, with power normalization occurring after analog-to-digital conversion.

Eqs. 1, 3 and 4 in combination with Eqs. 5–7 provide the mathematical foundation for the Mode Controlled Blind Adaptive Transversal Filter of the present invention. FIG. 2a is a block diagram of an embodiment of the invention. FIG. 2b is a block diagram of an alternative embodiment of the invention.

The coefficients characterizing the transversal filter are stored in a vector W. For a filter characterized by N coefficients, the vector W will have N elements. The updates of L arbitrary coefficient vector elements, where $N>L \geq 1$, is determined in accordance with Eqs. 2–4 (i.e. one or more coefficients are updated in accordance with the constant modulus error estimate $e_{cm}$). The remaining N-L coefficient elements are updated in accordance with equations 6 and 7 below. The subscript g refers to the L coefficients updated in accordance with Eqs. 2–4, and h to refer to the N-L other coefficients updated using the variable mode error estimate $e_{vm}$ in accordance with Eq. 7. The L coefficients do not need to be continuously indexed elements in the coefficient vector W. The L elements chosen can be any arbitrary subset of the N coefficient elements.

$$w_g(k+1)=w_g(k)-\mu e_{cm}(k)x^*_g(k), \text{ where} \quad \text{Eq. 5}$$

w, μ, $e_{cm}(k)$, and x(k) were defined earlier.

$$w_h(k+1)=w_h(k)-\mu e_{vm}(k)x^*_h(k-i) \quad \text{Eq. 6}$$

$$e_{vm}(k)=[|y(k)|^2-(1-\alpha(k))R]y(k) \text{ where;} \quad \text{Eq. 7}$$

The $e_{vm}(k)$ signal is referred to as the variable mode error estimate signal, the α(k) signal is referred to as the mode variable signal, and R is an arbitrary constant value. The invention is not limited in the choice of R. In an exemplary embodiment, R is set to the value of $R_2$, which is defined in Eq. 4. In the exemplary embodiment where the invention is used in an FM receiver, the E[y(k)]=$R_o$, so that the value of $R_2$ becomes $R_o^2$. Note that $R_o$ is a constant for FM.

Furthermore, in an exemplary embodiment, the first coefficient $w_o$ is adjusted in accordance with a constant modulus algorithm in accordance with Eqs. 2–4, and all other coefficient signals are adjusted using the variable mode error criteria in accordance with Eqs. 6–7.

Figure 1:
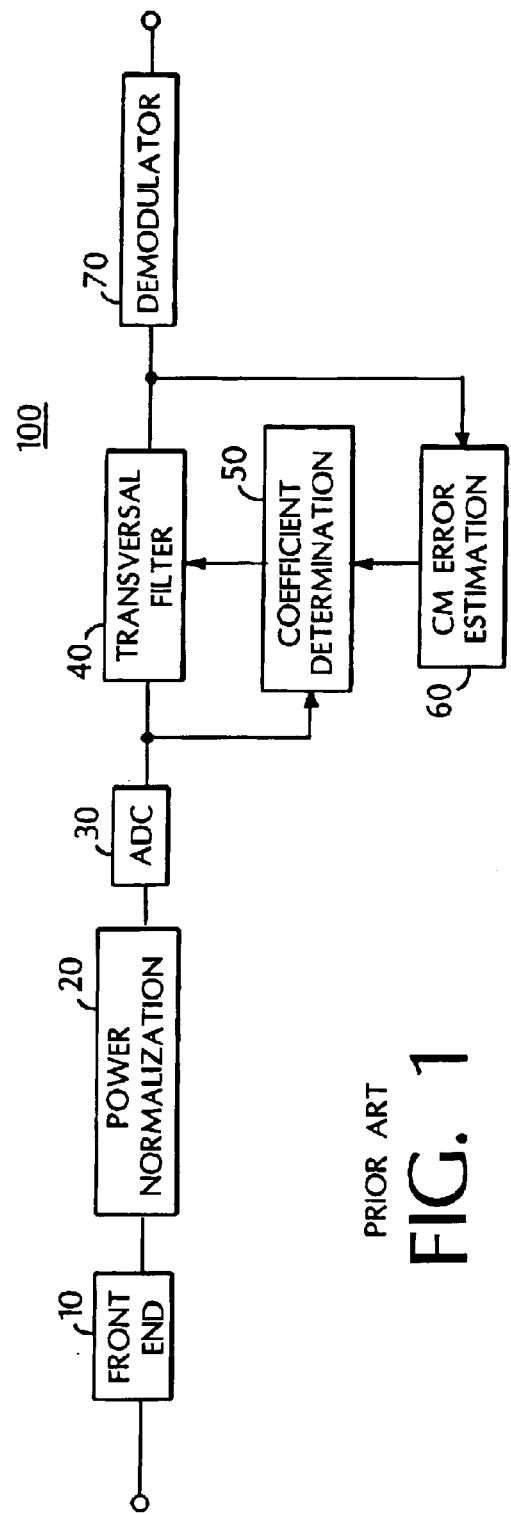
FIG. 1 is a block diagram of a prior art system that uses a constant modulus algorithm to adjust coefficients of a transversal filter placed in the path of the signal of interest.

In the system of FIG. 2a, an input signal is first received by front end 210, which operates similarly to front end 10 of prior art system 100 of FIG. 1. The output of front end 210 then passes through power normalization block 220. Since this function is located ahead of ADC 230, it is typically implemented in analog form. An AGC circuit can be used to accomplish a power normalization function. AGC circuits are known in the prior art, and will not be described in great detail.

FIG. 2b places power normalization 320 after ADC 330. Again, an AGC circuit could be used to provide the power normalization function. In this case, the AGC function typically in digital form. Techniques for accomplishing a digital AGC function are well known, and will not be described in further detail here.

Power normalization functions of blocks 220 and 320 described above preferably occur as a function of time at a rate sufficiently slower than the rate at which the adaptive filter coefficients are updated so that the adaptive filter converges to a solution.

Other embodiments may accomplish power normalization with the algorithm that adjusts filter coefficients. An example of such an algorithm is the normalized LMS algorithm (NLMS). Power normalization is accomplished in NLMS by dividing the adaptation step size parameter m (which is a constant in LMS) by an estimate of the power contained in the computed error signal. One skilled in the art could readily adapt this power normalization technique for use in CMA.

The invention is not limited in the form of the power normalization function used. The invention is also not limited in the location of the power normalization function. Power normalization can be accomplished in AGC's placed before or after analog to digital conversion, or included as part of the adaptive filter algorithm. An exemplary embodiment uses an analog AGC located ahead of the ADC. Placing the AGC at this location has the advantage of enhancing the dynamic range of the ADC.

Power normalization located in the signal path operates slightly differently than power normalization performed within the adaptive algorithm because power normalization within the adaptive algorithm normalizes the power in the error signal, not the SOI. The effect of the power normalization in each case, however, is essentially the same. All of the power normalization methods describe are used to improve the adaptation performance of the system, and all of the described methods accomplish similar improvements.

In FIG. 2a, the output of power normalization block 220 is then digitized by ADC 230, and the output of ADC 230 is fed to the input of transversal filter 240, and to coefficient signal determination block 250. In FIG. 2b, the output of front end 310 is digitized by ADC 330. The output of ADC 330 is fed to power normalization block 320, which then feeds the input of transversal filter 340 and coefficient determination block 350.

Transversal filters 240 and 340 process signals in accordance with Eq. 1 to provide outputs dependent on the input data and the coefficient vector. The outputs of transversal filters 240 and 340 feed into data demodulators 270 and 370, and into spectral mean frequency detectors (SMFD) 272 and 372, respectively. The function of data demodulators 270 and 370 is to recover the desired modulation. The invention can be used with numerous modulation methods, and is not limited to any specific method. In the exemplary embodiment describing use of the invention in a stereo RF FM receiver, the data demodulator comprises an FM detector.

Additional decoding of the demodulated signal may be required, if the modulating signal was encoded. The invention is not limited in the form of encoding and decoding with which it may be used.

SMFD 272 and 372 detect the mean spectral frequency of the output of transversal filters 240 and 340. This signal is used as an indication of the presence of adjacent channel interference. Any detector that possesses the ability to detect the mean spectral frequency of a signal can be used here, and the invention is not limited to using any one particular type of detector. Detectors can be realized for use in the current invention in analog or digital form, and may be implemented in hardware or softwarem, or combination thereof.

Figure 3A:
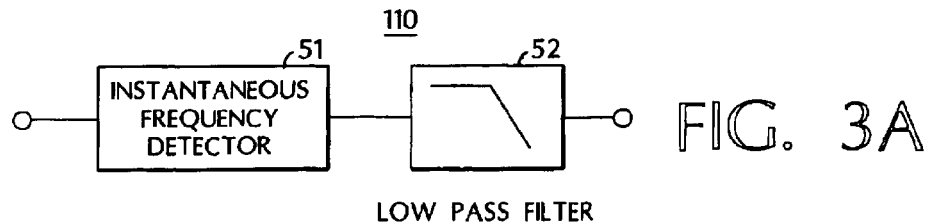
FIG. 3a is a block diagram of a simplified spectral mean frequency detector.

An SMFD can be implemented as shown in FIG. 3a. SMFD 110 of FIG. 3a is comprised of instantaneous frequency detector 51, which is implemented as an FM detector in an exemplary embodiment (FM detectors typically detect the instantaneous frequency of a signal), followed by an averaging operation, which is accomplished by low pass filter 52. Low pass filtering the output of an FM detector averages the output of the FM detector, which results in a signal representative of the mean spectral frequency. Low pass filter 52 may be a simple first order low pass filter. However, the invention is not limited in the type of low pass filter used. The low pass filter used in SMFD 110 is not required to meet any specific passband and stopband characteristics. Furthermore, the low pass filter can perform scaling if desired. Other processing could be substituted for low pass filter 52 to perform an averaging function (such as a moving average filter). The invention is not limited in the manner of processing used to accomplish an averaging function.

Figure 6A:
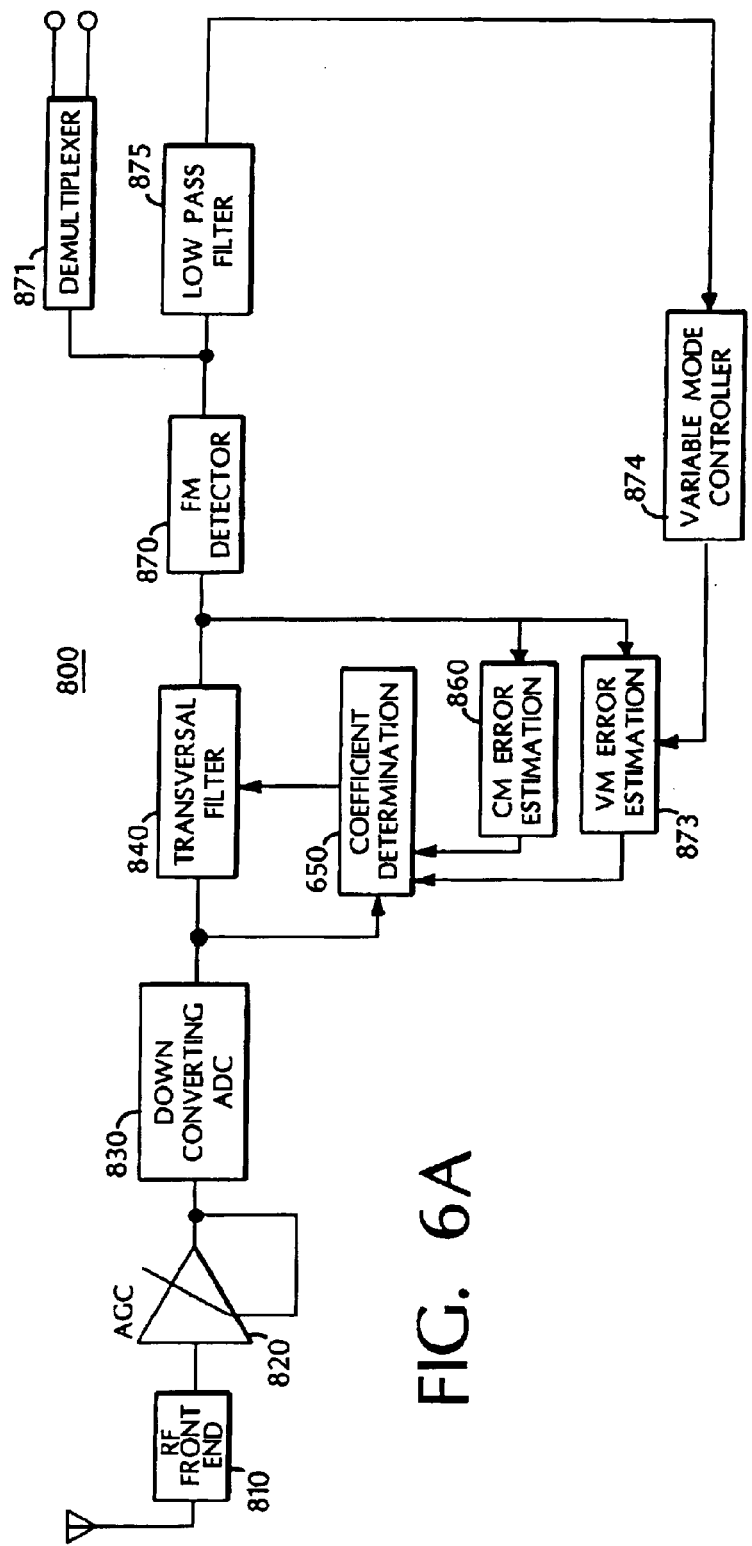
FIG. 6a is a block diagram of an exemplary embodiment of the mode controlled blind adaptive filter of the present invention in an FM stereo receiver, where the power normalizing AGC is implemented in analog form and is located before analog-to-digital conversion.
Figure 6B:
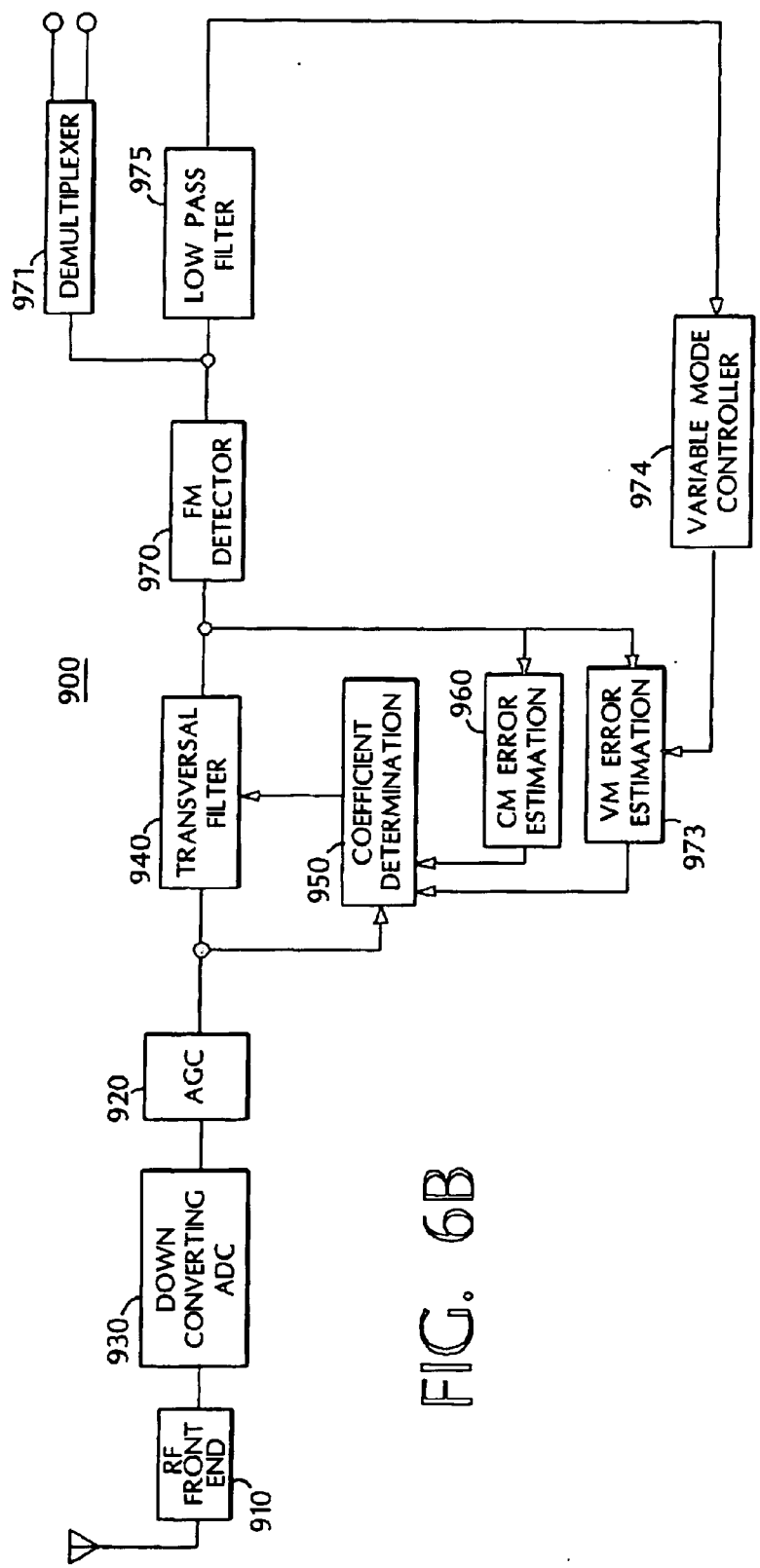
FIG. 6b is a block diagram of an alternative embodiment of the mode controlled blind adaptive filter of the present invention in an FM stereo receiver, where the power normalizing AGC is implemented in digital form and is located after analog-to-digital conversion.

In the exemplary embodiment of an FM receiver, the FM detector used to detect the instantaneous frequency is also used as the data demodulator. This is shown in FIGS. 6a and 6b. The outputs of FM detectors 870 and 970 are each split into two paths. One path leads to low pass filter 875 and 975 (which are portions of the SMFD), as described above. The other path is the desired signal, which may be decoded as needed.

Figure 3B:
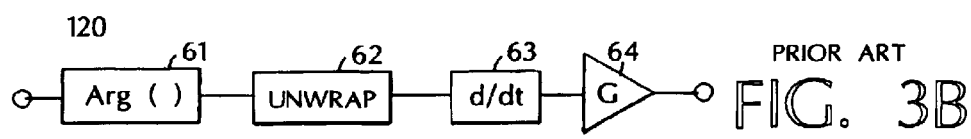
FIG. 3b is a block diagram of an idealized prior art FM detector.

FM detector 120 is shown in FIG. 3b. FM detectors can be implemented in analog or digital form, in hardware or in software, or combinations thereof. The invention is not limited in the manner in which an FM detector is implemented. Arg block 61 of FM detector 120 first extracts the argument (or angle) of the modulated signal. Unwrap block 62 then unwraps the extracted angle to remove discontinuities. d/dt block 63 then differentiates the unwrapped angle with respect to time. The output of the differentiation is then scaled by gain block 64. The output of gain block 64 is the signal of interest (the recovered data).

FM detectors are widely known in the prior art, and specific embodiments will not be described in further detail here. An FM detector could be implemented in the current invention using any one of a number of known techniques.

SMFD outputs 272 and 372 are input to variable mode controller blocks 274 and 374 respectively, which use this information to determine how to vary the operating mode of the adaptive filter. The output of variable mode controller blocks 274 and 374 is the mode variable signal $\alpha(k)$. The $\alpha(k)$ signal is a function of the SMFD output. The $\alpha(k)$ signal is preferably a positive, semidefinite, monotonic, and symmetric about zero function of the output of the SMFD. There are a large number of functions that could be created that have the above properties, any of which could be applied to the invention. Any function or functions that satisfy the stated preferences would work in the invention, and the invention is not limited in the form of the function used to meet these preferences.

In an exemplary embodiment, the range of values for $\alpha(k)$ is preferably bounded between zero and 1 (although the invention is not restricted to operation only over this range of values). Furthermore, the exemplary embodiment implements a small dead band, where $\alpha(k)$ is held to a zero value for small values of the SMFD output. The operations of bounding the range of values of $\alpha(k)$ and adding a dead band region are not required in order for a mode controlled blind adaptive filter to function. Inclusion of these features does however, improve the ability of the system to adapt to the desired signal.

Figure 4A:
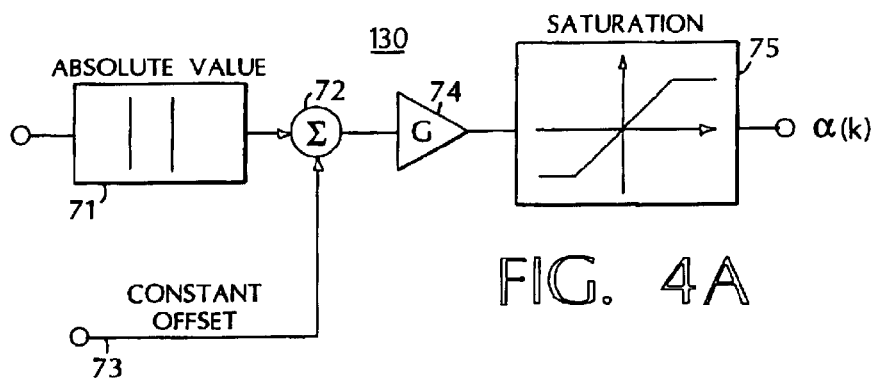
FIG. 4a is a block diagram representation of the operation of a variable mode controller for determining the mode control variable signal $\alpha(k)$.

FIG. 4a is a block diagram representing the determination of the $\alpha(k)$ signal in an exemplary embodiment. It is convenient to assume that the SMFD used to detect the mean spectral frequency is operating at baseband frequencies. For an FM signal at baseband, complex frequency modulation results in the instantaneous frequency of the modulated signal having both positive and negative frequency deviations about center frequency. The output of the SMFD will be a varying DC level about zero.

The current invention could operate at IF or RF frequencies if desired. This would only add an offset to the output of the SMFD, which could easily be removed in a subsequent stage. However, it is convenient to operate at baseband, as removal of this offset is not required. The complete system comprising the invention could be scaled to work at IF or RF frequencies, without loss of generality.

The signal at the output of low pass filter 52 of the SMFD will be symmetric about zero (for operation at baseband) and monotonic. This is the input to variable mode controllers 274 and 374, whose operation is further described in connection with FIG. 4a. Variable mode controller 130 of FIG. 4a first takes the absolute value of the low pass filter output, in absolute value block 71. Taking the absolute value gives the resulting signal a positive semidefinite characteristic. The signal at this point possesses the characteristics for the invention to function as intended.

An exemplary embodiment adds an offset constant 73 to the output of absolute value block 71 using summer 72. The offset is used to provide a deadband about 0 for $\alpha(k)$. The amount of offset used may be varied to fine tune operation of the invention for particular applications. The deadband will keep the $\alpha(k)$ signal value equal to zero for small variations about zero of the SMFD output.

Figure 4B:
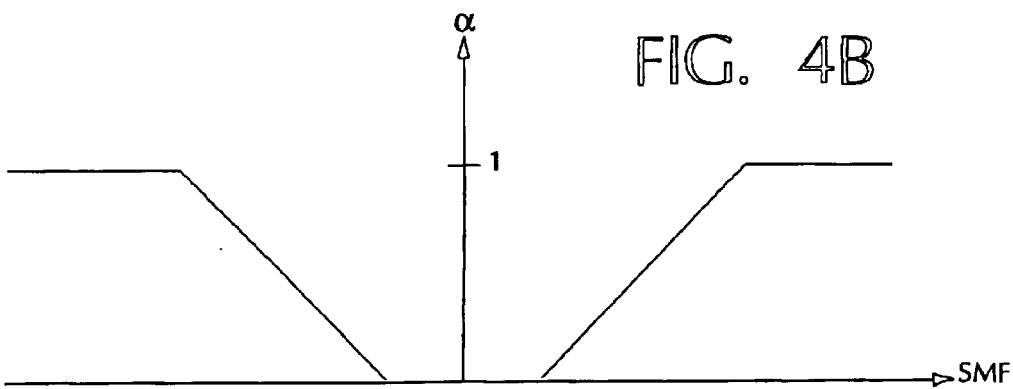
FIG. 4b is a graph of the mode control variable $\alpha(k)$ vs. the spectral mean frequency (SMF) of the output of the adaptive transversal filter.

The resulting signal then passes through gain block 74 and saturation block 75. Gain is another parameter that can be adjusted to fine tune behavior of the system for particular applications. Saturation block 75 in an exemplary embodiment bounds the resulting signal to values between zero and 1, although other range values could be chosen if desired. A graph showing the relationship between the SMFD output and $\alpha(k)$ in the preferred embodiment is shown in FIG. 4b.

The outputs of transversal filters 240 and 340 and variable mode controllers 274 and 374 are the inputs to Variable Mode Error Estimation blocks 273 and 373. The output of Variable Mode Error Estimation blocks 273 and 373 is the variable mode error estimate signal $e_{vm}$. Determination of $e_{vm}$ is based on these inputs and the value of the constant R (which is expected value of the modulus of the transversal filter output, and is equal to $R_o$ in an exemplary embodiment), in accordance with Eq. 7.

The inputs to Constant Modulus Error Estimation blocks 260 and 360 are the outputs of transversal filters 240 and 340 respectively. The constant modulus error estimate is determined in accordance with Eq. 3, and is the same as was described with regard to the Constant Modulus error block 60 of FIG. 1.

The outputs of the error estimate blocks 260, 360, 273, 373, and the digitized input data, all feed into coefficient determination blocks 250 and 350. Coefficient determination blocks 250 and 350 determine coefficient update signals in accordance with Eqs. 5 and 6. Eq. 5 describes the update determination for the L transversal filter coefficient(s) that is (are) to be updated in accordance with a constant modulus error criteria, and Eq. 6 describes the update calculation for the N-L transversal filter coefficients that are to be updated in accordance with a variable mode error criteria. In an exemplary embodiment, the first filter coefficient is updated in accordance with Eq. 5, and all other coefficients are updated in accordance with Eq. 6.

The mode variable $\alpha(k)$ signal is used to modify the magnitude of the constant R used in the determination of the $e_{vm}[k]$ signal. That is, the $\alpha(k)$ signal modifies the error cost function signal that is used to adjust the N-L adaptive transversal filter coefficient signals that are designated to be updated based on the variable mode error criterion (i.e. the $\alpha(k)$ signal varies the mode of the adaptive filter). The $\alpha(k)$ signal is a variable that can be controlled in some manner. When the $\alpha(k)$ signal is set to 0, $e_{vm}[k]=e_{cm}[k]$, and the variable mode error based coefficient signal is identical to the constant modulus error based coefficient update signal. In the exemplary embodiment, for the case where the $\alpha(k)$ signal=0, the variable mode error criteria is identical to the constant modulus error criteria, and operation of the system degenerates into CMA 2-2 behavior.

The operating mode of the adaptive transversal filter may be held constant or allowed to vary, by either; a) holding the $\alpha(k)$ signal constant or b) allowing the $\alpha(k)$ signal to vary with time in some manner. The invention is not limited in the manner in which the value of the mode variable is changed over time. The exemplary embodiment of the invention allows the mode variable to vary with time.

As stated earlier for the exemplary embodiment (where the first filter coefficient signal is updated using a constant modulus error criteria and the remaining coefficient signals are updated using a variable mode error criteria), when the mode variable is set to zero, the system behaves as a CMA 2-2 based adaptive filter. When the mode variable is set to 1, the adaptive filter behaves in a manner referred to as a "Kurtosis Whitener". Signal whiteners are known in the prior art (a single step linear predictor is one example), and they are often used to estimate the inverse of the energy present in a signal as a function of frequency. This use is also the function of a Kurtosis Whitener in the invention.

The Kurtosis Whitener minimizes the correlation of the cube (third power) of the filter output against all taps of the adaptive filter except the first, which in effect minimizes the normalized Kurtosis of the filter output (with the constraint that the average modulus is held at or near R). The Kurtosis Whitener generates a smooth estimate of the inverse of the signal energy.

The exemplary embodiment of the invention can vary its behavior between operating as a CMA-based adaptive filter and operating as a Kurtosis Whitener. Stated another way, the system can change its behavior from acting to invert the transfer function of linear processing located anywhere in the signal path between the output of a modulation operation and the input to the adaptive filter, to inverting the spectrum of the signal present at the filter input.

The behavior of the exemplary embodiment of the invention for mode values between zero and one is difficult to exactly describe. The system has characteristics that vary between those of either extreme discussed above. That is, the behavior of the complete system smoothly varies between inverting the transfer function of linear processes located between the modulator and the transversal filter, and inverting the spectrum of the signal present at the transversal filter input, as the $\alpha(k)$ signal varies.

The behavior of the invention where a first arbitrary subset of coefficient signals are updated based on a constant error criteria and a second complimentary set of coefficient signals are updated based on a variable mode error criteria is also difficult to exactly describe. The behavior of the system for the case where L is small compared to N will be similar to the behavior where L=1, described above for the exemplary embodiment.

The invention operates over a range of mode values, rather than switching between a few different discrete values (say zero and one). The mode value controls the determination of the error estimate for the adaptive filter. Changes in the mode value preferably occur smoothly.

Preferably, when a strong interfering signal is present, the adaptive filter initially acts as a signal whitener. This is accomplished in the invention by the action of SMFD blocks 272 and 372, and variable mode control blocks 274 and 374. When an interfering signal is detected, the output of SMFD 272 and 372 will be nonzero, and the mode variable $\alpha(k)$ signal will increase from zero to some positive value (between zero and one in the exemplary embodiment), depending on the strength of the interfering signal relative to the desired signal. The mode of the adaptive filter of the exemplary embodiment varies so that it behaves more like a Kurtosis Whitener when an adjacent interfering signal is detected. The stronger the interfering signal, the larger the value of the $\alpha(k)$ signal and the closer to Kurtosis Whitening the adaptive filter behavior gets.

Whitening forces the adaptive filter to attenuate the energy due to the interfering signal with respect to the desired signal, when the interfering signal is strong. That is, the coefficients of the transversal filters 240 and 340 have been adjusted by variable mode controllers 274 and 374 to find a solution that attenuates the interfering signal with respect to the desired signal, when the interfering signal is strong. This solution will have a location on the error surface that is closer to the location of the local minimum solution that favors the desired signal and rejects the interfering signal.

As the signal is whitened, the output of adaptive filters 240 and 340, on which SMFD 272 and 372 perform detection, will have a flat spectrum. The flattening (or whitening) operation reduces the level of the interfering signal present at the filter outputs compared to the desired signal, and as a result the outputs of SMFD 272 and 372 accordingly. As the outputs of SMFD 272 and 372 decreases (the $\alpha(k)$ signal trends back toward zero), the error cost function signal will approach CMA operation. An advantage of the invention is that in this case, the error cost function signal is approaching CMA, but the coefficient signals were effectively initialized to a point from which CMA will find the desired solution. As the system adjusts coefficient signals further, and the solution approaches the desired solution, the interfering signal present at the outputs of transversal filters 240 and 340 is further attenuated. The output of SMFD 272 and 372 drops further to the point where the deadband function included in the calculation of the $\alpha(k)$ signal sets the $\alpha(k)$ signal to zero.

Figure 5A:
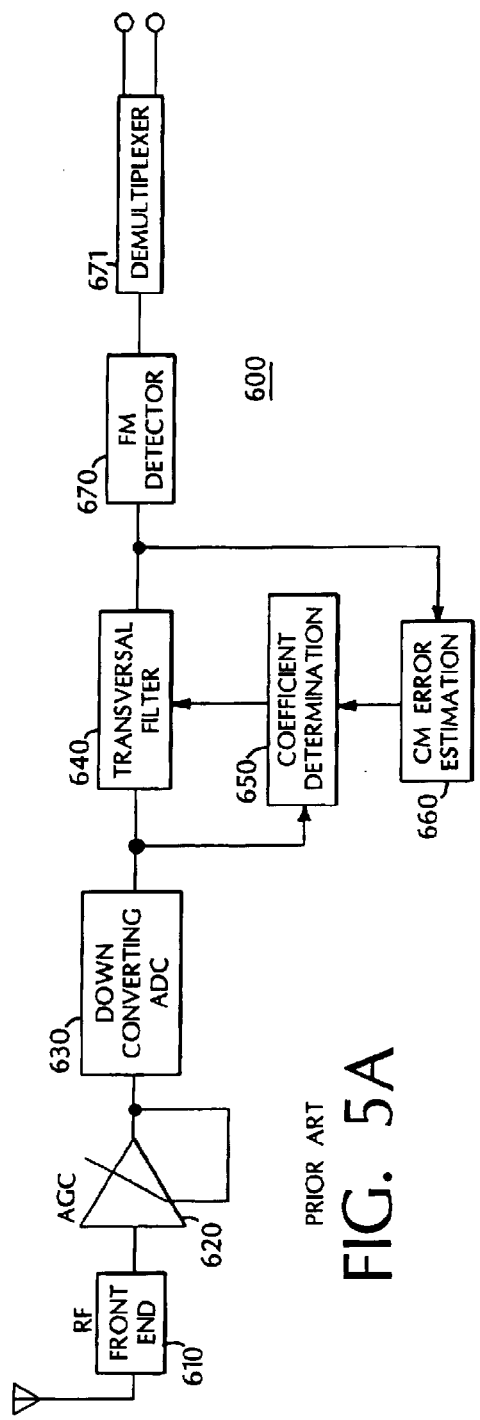
FIG. 5 is a block diagram of a prior art FM stereo receiver using a constant modulus algorithm to adjust coefficients of a transversal filter placed in the path of the SOI.
Figure 5B:
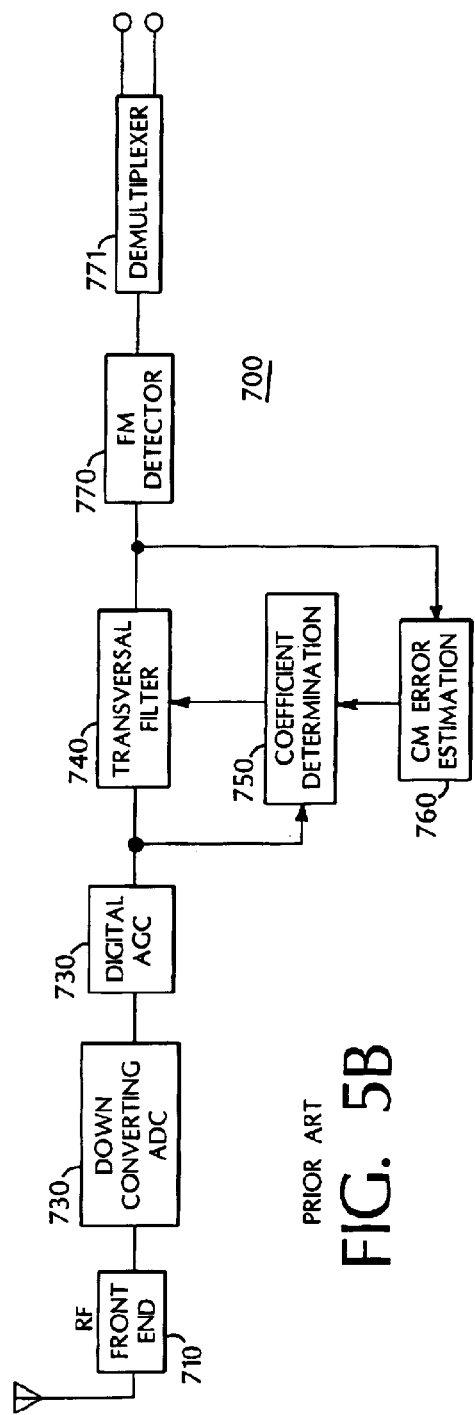

FIG. 5a is a block diagram of a prior art FM RF receiver that attempts to reduce the effects of multipath interference on a received FM stereo radio signal. The only differences between system 600 of FIG. 5a and general prior art system 100 of FIG. 1 are; 1) front end block 610 is now shown as an RF front end, 2) power normalization block 20 has been replaced by AGC 620, 3) demodulation block 70 has been replaced with FM detector 670, and 4) demultiplexer block 671 has been added. FIG. 5b is similar to FIG. 5a, except that AGC 720 has been moved after ADC 730, and is implemented digitally rather than analog. Performance of system 600 of FIG. 5a and system 700 of FIG. 5b are otherwise identical, and only operation of system 600 will be discussed further here.

FM detector 670 demodulates the FM signal, and demultiplexer 671 splits the demodulated signal into separate left and right channel audio signals. Demultiplexer 671 can be thought of as providing a data decoding function. This system works in the same manner as was described for general system 100 of FIG. 1. System 600 adjusts the coefficient signals of transversal filter 640 in an attempt to make the output of transversal filter 640 have a constant modulus characteristic.

The invention is particularly advantageous when used in an FM receiver. It is often the case that adjacent channel interference will be present in FM receivers, especially for mobile receivers (such as in vehicles). Furthermore, the relative signal strengths of adjacent channels in a mobile receiver can vary significantly, as motion of the receiver causes the relative transfer functions between the source of desired and interfering signals with respect to the receiver to vary.

FIG. 6a is a block diagram of the exemplary embodiment of the current invention used as an RF stereo FM receiver. This system is very similar to the system of FIG. 2a in operation, with the following small structural differences; 1) front end 210 has been replaced with RF front end 810; 2) downconverting ADC 830 has replaced ADC 230; 3) power normalization block 220 has been replaced by AGC 820; 4) FM detector 870 is used in combination with low pass filter 875 replacing SMFD 272; 5) FM detector 870 used as part of the SMFD also replaces data demodulator 270, (because the modulation of interest here is frequency modulation) and; 6) demultiplexing function 871 has been added to extract the stereo left and right channel signals from the output of the demodulator. FIG. 6b is essentially identical to the system of FIG. 6a, except that power normalization in the form of an AGC is located after the ADC, and is implemented in digital form. Operation of systems 800 and 900 is essentially identical, except for the location of the AGC function. As a result, only operation of system 800 will be described. Operation of system 900 can be directly inferred from the description of system 800.

Downconverting ADC 830 is shown to illustrate that the adaptive filter and mode control functions are operating at baseband frequencies. Downconverting ADC's are well known in the prior art, and will not be described in detail here. A downconverting ADC simultaneously accomplishes digitization of a signal and frequency conversion (from RF or IF to baseband). Separate steps of digitization and down conversion could also be used, and the invention is not limited to how these specific functions are accomplished.

Some blocks have been omitted for clarity. For example, antialias filters, D/A converters and reconstruction filters have not been shown. One skilled in the art can implement the necessary processing steps to effectively convert signals as needed between analog and digital forms. In the system of FIG. 6b, a logical place to perform D/A conversion would be in the path between FM detector 870 and de-multiplexer 871. This arrangement would allow the entire adaptive algorithm to be performed completely in the digital domain, without an additional A/D (which would be needed if the FM detector were implemented as an analog function.

It is evident that those skilled in the art may now make numerous modifications of and departures from the apparatus and techniques herein disclosed without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A method for adjusting the coefficients of a transversal filter comprising partitioning the coefficients into a first subset and a second subset, adjusting the coefficients in the first subset based on a first criterion, and adjusting the coefficients in the second subset based on a second criterion.

2. The method of claim 1 wherein the first criterion is constant.

3. The method of claim 1 wherein the second criterion is variable.

4. The method of claim 2 wherein the first constant criterion tends to minimize a first constant error cost function.

5. The method of claim 3 wherein the second variable criterion tneds to minimize a second variable error cost function.

6. The method of claim 1 wherein the first subset is adjusted based on a conventional constant modulus algorithm.

7. The method of claim 5 wherein the second variable error cost function is adjusted over time.

* * * * *